United States Patent
Fukushima et al.

(10) Patent No.: US 6,414,078 B1
(45) Date of Patent: Jul. 2, 2002

(54) CONDUCTIVE SILICONE RUBBER COMPOSITION

(75) Inventors: Motoo Fukushima; Tsutomu Nakamura; Mikio Iino, all of Gunma-ken (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/680,282

(22) Filed: Oct. 6, 2000

(30) Foreign Application Priority Data

Oct. 6, 1999 (JP) .......................... 11-285141
Mar. 21, 2000 (JP) ....................... 2000-078862

(51) Int. Cl.$^7$ .............................. C08K 3/08; C08K 3/36
(52) U.S. Cl. ................. 524/588; 428/450; 428/548; 428/448; 524/403; 528/31; 528/32
(58) Field of Search ................. 428/548, 448, 428/450; 524/588, 403; 528/32, 31

(56) References Cited

U.S. PATENT DOCUMENTS

| 4,011,360 | A | | 3/1977 | Waish |
| 4,507,359 | A | | 3/1985 | Powers, Jr. |
| 4,552,688 | A | | 11/1985 | Sakamoto et al. |
| 4,777,205 | A | * | 10/1988 | LaScola et al. |
| 4,836,955 | A | | 6/1989 | Ehrreich |
| 5,348,686 | A | | 9/1994 | Vyas |
| 5,498,644 | A | | 3/1996 | Reo |
| 5,688,862 | A | * | 11/1997 | Kondou et al. |
| 5,932,145 | A | * | 8/1999 | Mitani et al. |
| 6,010,646 | A | * | 1/2000 | Schleifstein |
| 6,017,587 | A | * | 1/2000 | Kleyer et al. |

FOREIGN PATENT DOCUMENTS

| EP | 0300380 A1 | | 1/1989 |
| EP | 0506272 A1 | | 9/1992 |
| EP | 0539123 A2 | | 4/1993 |
| EP | 1039480 A1 | | 9/2000 |
| GB | 1266422 | | 3/1972 |
| JP | 58063198 | | 4/1983 |
| JP | 01-089209 A | * | 4/1989 |
| JP | 01213362 A | | 8/1989 |
| JP | 05-194856 A | * | 8/1993 |

* cited by examiner

*Primary Examiner*—Robert Dawson
*Assistant Examiner*—Marc S. Zimmer
(74) *Attorney, Agent, or Firm*—Birch, Stewart, Kolasch & Birch, LLP

(57) ABSTRACT

In a silicone rubber composition comprising an organopolysiloxane having at least two aliphatic unsaturated groups and a curing agent, metallized particles of inorganic material or organic resin are effectively dispersed to give a conductive composition which cures into a conductive silicone rubber part having a low and stable volume resistivity.

8 Claims, No Drawings

CONDUCTIVE SILICONE RUBBER COMPOSITION

This invention relates to a conductive silicone rubber composition which cures into a conductive part having a low and stable volume resistivity.

BACKGROUND OF THE INVENTION

Prior art compositions for producing elastomers having a low resistivity include silicone rubber compositions of the addition reaction curing type, condensation reaction curing type, and peroxide vulcanizing type wherein powdered silver having a high electric conductivity is generally added to a polymer. The use of silver as the conductive powder has several problems because of a high agglomerating tendency and the lack of environmental stability. Silver particles do not uniformly disperse in silicone rubber and are readily oxidized or degraded on the surface in a hot humid atmosphere.

SUMMARY OF THE INVENTION

An object of the invention is to provide a conductive silicone rubber composition which cures into a conductive silicone rubber part having a low and stable volume resistivity.

It has been found that useful conductive particles are obtained by plating a metal on base particles of inorganic material or organic resin to form a plated metal layer on their surface. When the surface-metallized inorganic particles or organic resin particles are added to an organopolysiloxane, the resulting silicone rubber composition has a stable volume resistivity because of ease of dispersion of the particles. This silicone rubber composition can be cured with an organic peroxide or organohydrogenpolysiloxane/platinum group catalyst alone or a combination thereof. The cured part or silicone rubber has a constantly low electrical resistance or high conductivity and withstands a long term of service, finding best use as conductive contact members, business machine roll members, electromagnetic shielding gaskets, etc.

The invention provides a conductive silicone rubber composition comprising (A) 100 parts by weight of an organopolysiloxane having at least two aliphatic unsaturated groups represented by the following average compositional formula (1):

$$R^1_n SiO_{(4-n)/2} \tag{1}$$

wherein $R^1$, which may be the same or different, is a substituted or unsubstituted monovalent hydrocarbon group and n is a positive number of 1.98 to 2.02, (B) 90 to 800 parts by weight of conductive particles comprising base particles of an inorganic material or organic resin coated on their surface with a plated metal layer, and (C) a sufficient amount to cure component (A) of a curing agent.

DESCRIPTION OF THE PREFERRED EMBODIMENT

The conductive silicone rubber composition of the invention includes as a first essential component (A) an organopolysiloxane of the following average compositional formula (1):

$$R^1_n SiO_{(4-n)/2} \tag{1}$$

wherein $R^1$ is independently a substituted or unsubstituted monovalent hydrocarbon group and n is a positive number of 1.98 to 2.02.

The substituted or unsubstituted monovalent hydrocarbon groups represented by $R^1$, which may be identical or different, are preferably those of 1 to 10 carbon atoms, more preferably 1 to 8 carbon atoms. Examples include alkyl groups such as methyl, ethyl, propyl, butyl, hexyl, and octyl; cycloalkyl groups such as cyclohexyl; alkenyl groups such as vinyl, allyl, propenyl, butenyl, and hexenyl; aryl groups such as phenyl and tolyl; aralkyl groups such as benzyl and phenylethyl; and substituted ones of the foregoing groups in which some or all of the hydrogen atoms attached to carbon atoms are replaced by halogen atoms or cyano groups, such as chloromethyl, trifluoropropyl, and cyanoethyl. Of these, methyl, vinyl, phenyl and trifluoropropyl are preferable. At least two of the $R^1$ groups must be aliphatic unsaturated groups (i.e., alkenyl groups). The content of aliphatic unsaturated groups is preferably 0.001 to 20 mol%, more preferably 0.025 to 5 mol% of the $R^1$ groups. The letter n is a positive number of 1.98 to 2.02. Preferably, the organopolysiloxane of formula (1) basically has a linear structure, although a mixture of two or more organopolysiloxanes of different molecular structures is acceptable.

The organopolysiloxane should preferably have an average degree of polymerization of 100 to 20,000, and more preferably 3,000 to 10,000.

A second essential component (B) is conductive particles in the form of base particles coated on their surface with a plated metal layer. The base particles used are inorganic particles (also referred to as inorganic filler, hereinafter) or organic resin particles. By plating a metal on surfaces of the base particles, the conductive particles are obtained.

The inorganic fillers used herein include silica, titanium dioxide, alumina, mica, barium sulfate and carbon black, but exclude glass powder. Of these, silica and alumina, especially spherical silica and spherical alumina, are preferred as well as carbon black. Useful carbon black species include Ketjen Black, acetylene black, furnace black and channel black, with Ketjen Black and acetylene black being especially preferred. The organic resin particles include polyolefins such as polyethylene, polyvinyl chloride, polypropylene, and polystyrene, acrylic resins such as styrene-acrylonitrile copolymers and polymethyl methacrylate, amino resins, fluoro-resins, and nitrile resins. Of these, spherical particles of polymethyl methacrylate are preferred.

Although the base particles (inorganic fillers or organic resin particles) may have any appropriate particle size, they preferably have a mean particle size of 0.01 to 1,000 μm, and especially 0.01 to 10 μm. Too small a mean particle size corresponds to a too large specific surface area, which may need a more amount of plating metal and hence, a more expense. Particles with too large a mean particle size may be less dispersible in the silicone rubber composition.

Examples of the metal to be plated on the base particles include gold, silver, nickel, palladium, copper and alloys thereof. The plating layer may be a single layer of such metal or a multilayer structure of two or more plating layers of such metals. Of these metals, nickel and gold are preferred. More preferred are double metallized particles obtained by first plating nickel on the base particles and then plating gold on the nickel layer. Most preferred are metallized particles having a four-layer structure of base particle-silicon compound-nickel-gold in which a silicon compound intervenes between the base particle and nickel for improving the adhesion between the base particle and the plated metal layer. The silicon compounds used herein are silane coupling agents having a bonding ability such as aminopropyltriethoxysilane and aminopropyltrimethoxysilane and silicon polymers having a reducing ability.

The method of depositing a metal on the base particles is not critical. Either wet plating or gas phase deposition may be used. In the case of wet plating, any of well-known electroless or electric plating solution compositions may be used while any well-known pretreatment and any well-known plating method are used. In particular, a method comprising the following steps (1) to (4) is employed. Although the following description refers to the preparation of metallized silica using silica as a typical example of the base particles, it is understood that when other inorganic fillers or organic resin particles are used, metallized particles can be similarly prepared therefrom by following steps (1) to (4).

Step (1): Silica particles are treated with a silicon compound, preferably a silicon compound having a reducing ability to form a layer of the silicon compound on the silica surface.

Step (2): The particles resulting from step (1) are treated with a solution containing a salt of a metal having a standard oxidation reduction potential of at least 0.54 V to deposit the metal colloid on the silicon compound layer on the silica surface.

Step (3): While the metal colloid serves as a catalyst, electroless nickel plating is effected to deposit a metallic nickel layer on the silicon compound layer.

Step (4): Gold plating is effected to deposit a gold layer on the nickel layer.

In the preparation of metallized silica, the raw material silica is a powder of silicon dioxide having a high heat resistance. The shape is not critical and includes particles, fibers and flakes. In order to minimize the amount of a metal (nickel and gold) deposited and to increase the loading of metallized particles in silicone rubber, particles of spherical shape are desirable because the specific surface area is smallest among different shapes of the same particle size. Such silica is readily obtained by several means such as burning chlorosilane, hydrolyzing an alkoxysilane, oxidizing gasified metallic silicon and fusing quartz powder. For a lower specific surface area, those particles free of internal voids opening to the surface are desirable. Fused quartz is desirable in this sense.

Step (1)

In the preferred embodiment to prepare metallized silica, the above-described silica particles are first treated with a silicon compound having a reducing ability to form a layer of the silicon compound on the silica surface.

The silicon compound having a reducing ability is usually selected from the above-described silane coupling agents, and polysilanes, polycarbosilanes, polysiloxanes, and polysilazanes having Si—Si or Si—H bonds. Of these, polysilanes and polysiloxanes having a hydrogen atom directly attached to a silicon atom are preferred.

Typical of the polysilanes are polymers having Si—Si bonds in the backbone, represented by the following general formula (2).

(2)

In formula (2), $R^2$ and $R^3$, which may be the same or different, are independently hydrogen or substituted or unsubstituted, monovalent hydrocarbon groups. Included are aliphatic, alicyclic and aromatic monovalent hydrocarbon groups. The aliphatic or alicyclic monovalent hydrocarbon groups are preferably those of 1 to 12 carbon atoms, especially 1 to 6 carbon atoms, for example, alkyl groups such as methyl, ethyl, propyl, butyl, pentyl and hexyl, and cycloalkyl groups such as cyclopentyl and cyclohexyl. The aromatic monovalent hydrocarbon groups are preferably those of 6 to 14 carbon atoms, especially 6 to 10 carbon atoms, for example, phenyl, tolyl, xylyl, naphthyl and benzyl. Examples of the substituted monovalent hydrocarbon group include the above-exemplified unsubstituted monovalent hydrocarbon groups in which some or all of the hydrogen atoms are replaced by halogen atoms, alkoxy, amino or aminoalkyl groups, for example, monofluoromethyl, trifluoromethyl and m-dimethylaminophenyl.

X is a group as defined for $R^2$, an alkoxy group, halogen atom, oxygen atom or nitrogen atom. The alkoxy groups are preferably those of 1 to 4 carbon atoms, such as methoxy, ethoxy and isopropoxy. Exemplary halogen atoms are fluorine, chlorine and bromine atoms. Of these groups represented by X, methoxy and ethoxy are preferable.

Letter m is a number from 0.1 to 1, preferably from 0.5 to 1, k is from 0.1 to 1, preferably from 0.5 to 1, and p is from 0 to 0.5, preferably from 0 to 0.2, while they satisfy $1 \leq m+k+p \leq 2.5$, preferably $1.5 \leq m+k+p \leq 2$. Letter q is an integer in the range of from 2 to 100,000, preferably from 10 to 10,000.

The silicon compound having a hydrogen atom attached directly to a silicon atom (Si—H group) is not critical as long as it is an organohydrogenpolysiloxane having a hydrogen atom attached directly to a silicon atom. Preferred are polysiloxanes having Si—H groups on side chains and Si—O—Si bonds on the backbone, represented by the following general formula (3).

(3)

In formula (3), $R^4$ and $R^5$, which may be the same or different, are independently hydrogen, substituted or unsubstituted, monovalent hydrocarbon groups, alkoxy groups or halogen atoms. The monovalent hydrocarbon groups include aliphatic, alicyclic and aromatic monovalent hydrocarbon groups. The aliphatic or alicyclic monovalent hydrocarbon groups are preferably those of 1 to 12 carbon atoms, especially 1 to 6 carbon atoms, for example, alkyl groups such as methyl, ethyl, propyl, butyl, pentyl and hexyl, and cycloalkyl groups such as cyclopentyl and cyclohexyl. The aromatic monovalent hydrocarbon groups are preferably those of 6 to 14 carbon atoms, especially 6 to 10 carbon atoms, for example, phenyl, tolyl, xylyl, naphthyl and benzyl. Examples of the substituted, aliphatic, alicyclic and aromatic, monovalent hydrocarbon group include the above-exemplified unsubstituted monovalent hydrocarbon groups in which some or all of the hydrogen atoms are replaced by halogen atoms, alkoxy, amino or aminoalkyl groups, for example, monofluoromethyl, trifluoromethyl and m-dimethylaminophenyl. The alkoxy groups are preferably those of 1 to 4 carbon atoms, such as methoxy, ethoxy and isopropoxy. Exemplary halogen atoms are fluorine, chlorine and bromine atoms. Of these, methoxy and ethoxy are preferable.

Letter "a" is a number from 0.1 to 1, preferably from 0.5 to 1, b is from 0.1 to 1, preferably from 0.5 to 1, and c is from 0.01 to 1, preferably from 0.1 to 1 while they satisfy $1 \leq a+b+c \leq 2.5$, preferably $1 \leq a+b+c$ 2.2. Letter d is a number from 1 to 1.5. Letter e is an integer from 2 to 100,000, preferably from 10 to 10,000.

More illustratively, step (1) of forming a layer of silicon compound on the silica surface involves dissolving the silicon compound in an organic solvent, and admitting silica particles into the solution. After thorough mixing, the organic solvent is removed. A layer of the silicon compound is formed on surfaces of silica particles.

Examples of the organic solvent in which the silicon compound is dissolved include aromatic hydrocarbon solvents such as benzene, toluene, and xylene, aliphatic hydrocarbon solvents such as hexane, octane, and cyclohexane, ether solvents such as tetrahydrofuran and dibutyl ether, esters such as ethyl acetate, aprotic polar solvents such as dimethylformamide, dimethylsulfoxide, and hexamethylphosphoric triamide, nitromethane, and acetonitrile.

The solution preferably has a concentration of 0.1 to 50%, more preferably 0.01 to 30%, and most preferably 1 to 20% by weight of the silicon compound. At a concentration of less than 0.01%, the treatment must use a large amount of the solvent and thus becomes expensive. A concentration of more than 50% may sometimes fail to form a layer of the silicon compound over the entire surfaces of particles.

The treatment of silica particles with the silicon compound in the organic solvent may be effected in various ways, preferably by an agitation method involving mixing the particles with the organic solvent solution of the silicon compound to form a slurry, placing the slurry in a vessel with an agitating blade, rotating the agitating blade for effecting dispersion contact, or an atomizing method involving spraying the slurry into a gas stream for instantaneous drying.

In the treatment, the organic solvent is evaporated off at an elevated temperature and/or in vacuum. Effective drying is often achieved by continuing agitation at a temperature above the boiling point of the solvent, typically at a temperature of about 40 to 200° C. under a vacuum of 1 to 100 mmHg.

At the end of the treatment, the treated particles are held for a while in a dry atmosphere, or at a temperature of about 40 to 200° C. under vacuum whereby the solvent is fully evaporated off. The treated particles are dried in this way, yielding silicon compound-bearing particles.

The silicon compound layer preferably has a thickness of 0.001 to 1 μm, and especially 0.01 to 0.1 μm. A layer of less than 0.001 μm fails to completely cover the silica surface, leaving some areas less receptive to plating metal. A layer of more than 1 μm uses a larger amount of the silicon compound, leading to an increased expense.

As a result of the silicon compound treatment, the silica particles become hydrophobic. The silica particles will then lower their affinity to a solvent in which a metal salt is dissolved, so that the silica particles are not dispersed in the metal salt solution, precluding efficient reducing reaction of the metal salt. This loss of efficiency of metal salt reducing reaction can be compensated for by adding a surfactant. The surfactants used to this end are preferably those which act to reduce surface tension without foaming, typically nonionic surfactants such as Surfynol 104, 420 and 504 (Nisshin Chemical Industry K.K.).

Step (2)

The silica particles bearing a silicon compound layer on their surface resulting from step (1) are treated with a solution containing a salt of a metal having a standard oxidation reduction potential of at least 0.54 V, to deposit the metal colloid on the silicon compound layer. The surfaces of the silicon compound-treated particles are brought in contact with the solution of the metal salt. In this treatment, owing to the reducing action of the silicon compound, metal colloid is formed on the surface of the silicon compound layer, providing a metal coating.

Preferred examples of the salt of a metal having a standard oxidation reduction potential of at least 0.54 V include salts of gold (standard oxidation reduction potential 1.50 V), palladium (standard oxidation reduction potential 0.99 V), and silver (standard oxidation reduction potential 0.80 V). Salts of metals having a standard oxidation reduction potential of lower than 0.54 V, such as copper (standard oxidation reduction potential 0.34 V) and nickel (standard oxidation reduction potential 0.25 V) are little reduced with the silicon compound.

The gold salts are those of $Au^+$ and $Au^{3+}$, for example, $NaAuCl_4$, $NaAu(CN)_2$ and $NaAu(CN)_4$. The palladium salts are those of $Pd^{2+}$ and generally represented by the formula: Pd—$Z_2$ wherein Z stands for halogens such as Cl, Br and I, acetate, trifluoroacetate, acetylacetonate, carbonate, perchlorate, nitrate, sulfate and oxide. Illustrative examples are $PdCl_2$, $PdBr_2$, $PdI_2$, $Pd(OCOCH_3)_2$, $Pd(OCOCF_3)_2$, $PdSO_4$, $Pd(NO_3)_2$, and PdO. The silver salts are those which are dissolvable in a solvent and generate $Ag^+$ and generally represented by the formula: Ag—Z wherein Z is perchlorate, borate, phosphate and sulfonate. Illustrative examples are $AgBF_4$, $AgClO_4$, $AgPF_6$, $AgBPh_4$, $Ag(CF_3SO_3)$, and $AgNO_3$.

Examples of the solvent in which the metal salt is dissolved include water, ketones such as acetone and methyl ethyl ketone, alcohols such as methanol and ethanol, and aprotic polar solvents such as dimethylformamide, dimethylsulfoxide, and hexamethylphosphoric triamide. Of these, water is most preferred.

The concentration of the metal salt is preferably from 0.01% by weight to saturation although the concentration varies with the solvent in which the salt is dissolved. A concentration of less than 0.01% may deposit less colloid metal which fails to exert a full plating catalyst effect. Above the saturation, a solid salt may precipitate out. Where the solvent is water, the preferred concentration of the metal salt is from 0.01 to 20% by weight, and more preferably 0.1 to 5% by weight. Typically the silicon compound-treated particles are immersed in the metal salt solution at room temperature to about 70° C. for about 0.1 to 120 minutes, preferably about 1 to 15 minutes. In this way, metal colloid-bearing particles are obtained.

In the preferred procedure of step (2), the silicon compound-treated particles are first contacted with a dilution of a surfactant in water, then with the metal salt solution. This order solves the problem that as a result of the silicon compound treatment, the silica particles become hydrophobic and thus lower their affinity to the solvent in which the metal salt is dissolved, so that the silica particles are not readily dispersed in the metal salt solution, and efficient reducing reaction of the metal salt is precluded. The silicon compound-treated particles can be readily and briefly dispersed in the metal salt solution.

The surfactant used herein may be any of anionic, cationic, ampholytic and nonionic surfactants.

The anionic surfactants include sulfonic salts, sulfuric ester salts, carboxylic salts, and phosphoric ester salts. The cationic surfactants include ammonium salts, alkylamine salts and pyridinium salts. The ampholytic surfactants include betaine, aminocarboxylic acid, and amine oxide surfactants. The nonionic surfactants include ether, ester and silicone surfactants.

Illustratively, the anionic surfactants include alkylbenzenesulfonic acid salts, sulfosuccinic acid esters, polyoxyethylene alkyl sulfate salts, alkyl phosphate esters, and long chain fatty acid soaps. The cationic surfactants include alkyl chloride trimethylammonium salts, dialkyl chloride dimethylammonium salts, and alkyl chloride pyridinium salts. The ampholytic surfactants include betaine sulfonic salts and betaine aminocarboxylic amine salts. The nonionic surfactants include polyoxyethylene alkyl ethers, polyoxyethylene fatty acid esters and polyoxyalkylene-modified polysiloxanes. A commercially available aqueous solution of such surfactant, for example, Mama Lemon (Lion K.K.) is also useful.

Desirably 0.0001 to 10 parts, more desirably 0.001 to 1 part, and especially 0.01 to 0.5 part by weight of the surfactant is used per 100 parts by weight of the metal salt solution.

At the end of the metal salt treatment, the treated particles are washed with the same solvent, but free of the metal salt, for removing the unnecessary metal salt not carried by the particles. Finally, the treated particles are dried by removing the solvent. Such drying is preferably effected at 0 to 150° C. under atmospheric pressure or a reduced pressure.

Step (3)

In step (3), the silica particles bearing the metal colloid on their surface are subjected to electroless nickel plating while the metal colloid serves as a catalyst, thereby depositing a metallic nickel layer on the silicon compound layer.

The electroless nickel plating solution used herein generally contains a water-soluble nickel salt such as nickel sulfate or nickel chloride, a reducing agent such as sodium hypophosphite, hydrazine or sodium boron hydride and a complexing agent such as sodium acetate, phenylenediamine or sodium potassium tartrate. Such electroless nickel plating solutions are commercially available.

The electroless nickel plating method may be conventional and includes a batchwise mode of admitting particles into an electroless plating solution and a dropwise mode of adding dropwise the plating solution to a dispersion of particles in water (see Kougyo Gijutsu (Engineering), 28 (8), 42, 1987). In either mode, the deposition rate is controlled so as to prevent agglomeration and form a uniform, tightly bonding nickel coating. In some cases, however, it is difficult to produce nickel-coated silica. Particles having a large specific surface area have the problem that they are naturally very active in plating reaction so that plating reaction commences abruptly and soon becomes uncontrollable while the commencement of plating reaction is often delayed by the influence of oxygen in the surrounding atmosphere. A time is taken for nickel plating, with a frequent failure to produce uniformly plated particles.

Therefore, the nickel plating on silica particles is preferably carried out by the following procedure. The nickel plating solution is divided into an aqueous solution containing a reducing agent, pH adjuster, complexing agent and other additives and an aqueous solution of a nickel salt, The silica particles are dispersed in the aqueous solution of reducing agent and other additives, which is kept at an appropriate temperature for nickel plating. The nickel salt solution is carried by a gas and introduced into the reducing agent solution having silica particles dispersed therein. Then nickel plated silica particles are effectively produced without agglomeration. With the aid of the carrier gas, the aqueous nickel salt solution is quickly and uniformly dispersed in the aqueous solution of reducing agent and other additives whereby nickel plating takes place on the particle surface.

The introduction of gas often brings out a lowering of plating efficiency due to bubbling. This can be avoided by adding an anti-foaming surfactant. The surfactant is preferably one having an anti-foaming effect and reducing surface tension, for example, a polyether-modified silicone surfactant commercially available as KS-538 from Shin-Etsu Chemical Industry Co., Ltd.

In the case of electroless nickel plating, the oxygen concentration of the plating solution affects the deposition of nickel. The deposition of nickel is restrained by the presence of more dissolved oxygen because colloidal palladium serving as plating catalyst nuclei can be oxidized into palladium cations and dissolved out in the solution, and the once deposited nickel surface can be oxidized. Inversely, in the presence of less dissolved oxygen, the plating solution loses stability and nickel can deposit on areas other than the silica particles, resulting in formation of fine nickel powder masses and bulbous deposits. It is thus desirable to maintain the dissolved oxygen in the plating solution at a concentration of 1 to 20 ppm. Above 20 ppm, the plating rate may drop and uncovered spots be left. Below 1 ppm, formation of bulbous deposits is sometimes observed.

Therefore, it is preferable to use as the gas a mixture of an oxygen-containing gas such as air and an inert gas such as argon or nitrogen. In the case of plating on powder particles, the start of plating is often delayed, but there is the risk that once plating is started, the reaction runs away. In one effective procedure for preventing the risk, nitrogen is initially used and after the start of nickel plating reaction is confirmed, the gas is changed to air. Appropriate plating conditions include a temperature of about 35 to 120° C. and a contact time of about 1 minute to 16 hours, and more desirably about 40 to 85° C. and about 10 to 60 minutes.

Step (4)

The electroless nickel plating step is followed by the gold plating step whereby a plated gold layer is formed on the nickel layer.

The gold plating solution may be either an electrodepositing solution or an electroless plating solution, which may have a well-known composition and is commercially available. Use of an electroless gold plating solution is preferred. Gold plating may be carried out by a conventional method as mentioned above. It is effective to treat the nickel plated particles with a dilute acid prior to gold plating because the passivated surface resulting from oxidation of nickel can be removed by this acid treatment. The temperature and contact time for gold plating are the same as used for nickel plating. At the end of plating, the particles are preferably washed with water for removing the unnecessary surfactant.

In this way, metallized silica particles having a four-layer structure of silica-silicon compound-nickel-gold are obtained.

Preferably the nickel layer has a thickness of 0.01 to 10 $\mu$m, and more preferably 0.1 to 2 $\mu$m. A nickel layer of less than 0.01 $\mu$m may fail to completely cover the silica surface and is sometimes insufficient in hardness and strength. A thickness in excess of 10 $\mu$m leads to a larger amount of nickel, a higher specific gravity and an increased cost.

Preferably the gold layer has a thickness of 0.001 to 1 $\mu$m, and more preferably 0.01 to 0.1 $\mu$m. A gold layer of less than 0.001 $\mu$m has a higher resistivity and may fail to impart satisfactory conductivity upon compounding. A thickness in excess of 1 $\mu$m leads to a larger amount of gold and an increased cost.

Finally, the metallized silica particles are desirably heat treated at a temperature of at least 200° C. in the presence of a reducing gas. Treating conditions generally include a temperature of about 200 to 900° C. and a time of about 1 minute to 24 hours, and desirably about 250 to 500° C. and about ½ to 4 hours. With this heat treatment, the silicon compound between the silica base and the metal coatings is converted into a ceramic to achieve a higher heat resistance, higher insulation and tighter bond. The reducing atmosphere such as hydrogen during treatment serves to decrease oxides in the metal coatings and convert the silicon compound into a stable structure whereby the metal coatings are tightly bonded to the silica base, and the metallized silica particles have a high conductivity. It is noted that through heat treatment in a reducing hydrogen atmosphere, the silicon compound is converted into a ceramic material composed mainly of silicon carbide.

By the heat treatment at elevated temperature, the silicon compound between the silica base and the metal coatings is partially or entirely converted into a ceramic to achieve a higher heat resistance, higher insulation and tighter bond.

The conductive particles or metallized particles (B) preferably have a resistivity of up to 100 mΩ-cm (100×10$^{-3}$Ω-cm), more preferably up to 10 mΩ-cm, and most preferably up to 5 mΩ-cm.

The conductive particles (B) preferably account for 25 to 75% by volume, and especially 30 to 60% by volume of the entire composition. With a volume fraction of less than 25% by volume, conductivity may be insufficient. A volume fraction of more than 75% by volume may detract from workability.

The conductive particles (B) preferably have a specific surface area of up to 1 m$^2$/g. Particles with a specific surface area of more than 1 m$^2$/g may be less dispersible when added to the silicone rubber composition.

An appropriate amount of the conductive particles blended is about 90 to 800 parts, and especially about 100 to 500 parts by weight per 100 parts by weight of the organopolysiloxane. Less amounts fail to impart satisfactory conductivity whereas excessive amounts detract from workability.

A third essential component (C) is a curing agent which may be selected from well-known ones, for example, organohydrogenpolysiloxane/platinum base catalysts (curing agents for addition reaction) and organic peroxide catalysts.

Well-known platinum base catalysts for promoting addition reaction are useful. Exemplary catalysts are elemental platinum alone, platinum compounds, platinum complexes, chloroplatinic acid, complexes of chloroplatinic acid with alcohol compounds, aldehyde compounds, ether compounds, and olefins. The platinum base catalyst is added in a catalytic amount, desirably about 1 to about 2,000 ppm of platinum atom based on the weight of the organopolysiloxane (A).

Any desired organohydrogenpolysiloxane containing at least two hydrogen atoms each attached to a silicon atom (i.e., at least two SiH groups) in a molecule is useful. It may be of straight, branched or cyclic molecule. Preferably, it has the formula: $R^6{}_fH_gSiO_{(4-f-g)/2}$ wherein $R^6$ is a substituted or unsubstituted monovalent hydrocarbon group as defined for $R^1$, preferably free of aliphatic unsaturation, and letters f and g are numbers satisfying $0≦f<3$, $0<g<3$, and $0<f+g<3$. A degree of polymerization of up to 300 is preferable. Illustrative examples include diorganopolysiloxanes endblocked with a dimethylhydrogensilyl group, copolymers consisting of dimethylsiloxane units, methylhydrogensiloxane units and terminal trimethylsiloxy units, low-viscosity fluids consisting of dimethylhydrogensiloxane units ($H(CH_3)_2SiO_{1/2}$units) and $SiO_2$ units, 1,3,5,7-tetrahydrogen-1,3,5,7-tetramethylcyclotetrasiloxane, 1-propyl-3,5,7-trihydrogen-1,3,5,7-tetramethylcyclotetrasiloxane, and 1,5-dihydrogen-3,7-dihexyl-1,3,5,7-tetramethylcyclotetrasiloxane.

The organohydrogenpolysiloxane is added as the curing agent in such amounts that 50 to 500 mol% of silicon-attached hydrogen atoms are available based on the aliphatic unsaturated groups (alkenyl groups) in the organopolysiloxane (A).

The organic peroxide catalyst may be selected from well-known ones, for example, benzoyl peroxide, 2,4-dichlorobenzoyl peroxide, p-methylbenzoyl peroxide, o-methylbenzoyl peroxide, 2,4-dicumyl peroxide, 2,5-dimethyl-bis(2,5-t-butylperoxy)hexane, di-t-butyl peroxide, and t-butyl perbenzoate. The organic peroxide may be added in an amount of 0.1 to 5 parts by weight per 100 parts by weight of the organopolysiloxane (A).

In the silicone rubber composition of the invention, reinforcing silica powder may be added as an optional component insofar as the benefits of the invention are not impaired. The reinforcing silica powder is added for the purpose of improving the mechanical strength of silicone rubber. To this end, the reinforcing silica powder should preferably have a specific surface area of at least 50 m$^2$/g, especially 100 to 300 m$^2$/g. With a specific surface area of less than 50 m$^2$/g, the cured product would be rather reduced in mechanical strength. Examples of the reinforcing silica powder include fumed silica and precipitated silica, which may be surface treated with organosilicon compounds such as chlorosilanes or hexamethyldisilazane for hydrophobicization. The amount of reinforcing silica powder added is preferably 3 to 70 parts, especially 10 to 50 parts by weight per 100 parts by weight of the organopolysiloxane (A). Less than 3 parts of silica powder would be ineffective for reinforcement whereas more than 70 parts of silica powder would lead to poor workability and lower mechanical strength.

In combination with the conductive particles according to the invention, there may be added other well-known conductive agents, for example, conductive carbon black and conductive inorganic oxides such as conductive zinc white and conductive titanium oxide; and extending fillers such as silicone rubber powder, red iron oxide, ground quartz and calcium carbonate.

Where it is desired to form a sponge rubber, any of inorganic and organic blowing agents may be added. Exemplary blowing agents include azobisisobutyronitrile, dinitropentamethylene tetramine, benzenesulfonhydrazide, and azodicarbonamide. An appropriate amount of the blowing agent is 1 to 10 parts by weight per 100 parts by weight of the organopolysiloxane (A). By adding a blowing agent to the inventive composition, a conductive sponge silicone rubber is produced.

Moreover, various additives such as colorants, heat resistance modifiers, reaction control agents, parting agents, and filler dispersants may be added to the inventive compositions. The dispersants for fillers include diphenylsilane diol, alkoxysilanes, carbon functional silanes, and silanol group-bearing low molecular weight siloxanes. Such dispersants are added in minimal amounts so that the benefits of the invention may not be lost.

Where it is desired to make the silicone rubber composition flame retardant and fire resistant, well-known additives may be added. Examples include platinum-containing substances, a mixture of a platinum compound and titanium dioxide, a mixture of platinum and manganese carbonate, a mixture of platinum and γ-Fe$_2$O$_3$, ferrite, mica, glass fibers, and glass flakes.

The silicone rubber composition of the invention can be prepared by uniformly mixing the above-described components in a rubber mill such as a twin-roll mil, Banbury mixer or dough mixer (kneader), optionally followed by heat treatment.

The silicone rubber composition thus obtained may be molded to a shape for a particular application by various molding methods, for example, compression molding, extrusion molding and calender molding methods. Curing conditions are properly selected depending on the curing method and the thickness of a molded part although the preferred set of conditions includes a temperature of about 80 to 400° C. and a time of about 10 seconds to 30 days.

The cured product of the silicone rubber composition has a volume resistivity of up to 1 Ω-cm, and especially up to $1\times10^{-1}$ Ω-cm, which indicates that the cured product can be used as electromagnetic shields.

EXAMPLE

Examples of the invention are given below by way of illustration and not by way of limitation. All parts are by weight.

Synthesis Example 1

Synthesis of Metallized Silica Treatment of Silica with Silicon Polymer

The silica used herein was spherical silica US-10 (Mitsubishi Rayon K.K., mean particle size 10 µm). A solution of 5 g of phenylhydrogenpolysilane (PPHS) in 65 g of toluene was added to 100 g of US-10, which was agitated for one hour into a slurry. The treated silica was dried in a rotary evaporator by evaporating off 65 g of toluene at a temperature of 80° C. and a vacuum of 45 mmHg. The PPHS-treated spherical silica was disintegrated by means of a roll mill or jet mill.

Preparation of Palladium Colloid-deposited Silica

The PPHS-treated spherical silica would float on the surface of water since it was hydrophobicized. The PPHS-treated spherical silica, 100 g, was admitted into 50 g of a 0.5% aqueous solution of surfactant Surfynol 504 (Nisshin Chemical Industry K.K.), which was agitated whereby the silica was dispersed in water within a short time of about 5 minutes.

For palladium treatment, 70 g of a 1% $PdCl_2$ aqueous solution (0.7 g of palladium chloride, 0.4 g of palladium) was added to 150 g of the water dispersion of silica, followed by 30 minutes of agitation, filtration and water washing. By this treatment, palladium colloid adhered to the silica surface. This palladium colloid-deposited silica was colored blackish gray. The silica was separated by filtration, washed with water, and immediately subjected to plating.

Nickel Plating on Palladium Colloid-deposited Silica

A reducing solution for nickel plating was 100 g of a mixture of 2.0 M sodium hypophosphite, 1.0 M sodium acetate and 0.5 M glycine in deionized water. The palladium colloid-deposited silica was dispersed in the reducing solution together with 0.5 g of anti-foaming agent KS-538 (Shin-Etsu Chemical Co., Ltd.). With vigorous stirring, the reducing solution having the silica dispersed was heated from room temperature to 65° C. A dilution of 2.0 M sodium hydroxide in deionized water was carried by air and added dropwise to the reducing solution and at the same time, a dilution of 1.0 M nickel sulfate in deionized water was carried by nitrogen gas and added dropwise to the reducing solution. Fine bubbles evolved and the silica particles became black, indicating deposition of metallic nickel on the entire surface of silica.

Gold Plating of Nickel-plated Silica

The gold plating solution used was 100 g of a gold plating solution K-24N (Koujundo Kagaku Kenkyuujo) without dilution. The silica having metallic nickel deposited on the entire surface was dispersed in the gold plating solution. With vigorous stirring, the solution temperature was raised from room temperature to 95° C. Fine bubbles evolved and the silica particles became golden, indicating that gold deposited on the silica surface.

The silica particles precipitated on the bottom of the plating vessel were filtered, washed with water, and dried at 50° C. for 30 minutes, and thereafter, fired at 300° C. for one hour in a hydrogen-purged electric furnace. By observation under a stereomicroscope, it was found that the silica particles were covered with gold over their entire surface. Upon IPC analysis of the silica particles, palladium, nickel and gold were detected.

Identification of Conductive Silica Having Silica-Silicon Compound-nickel-gold Structure The gold-plated silica was mixed with an epoxy resin (Araldite A/B) which was cured. A slice was observed under an electron microscope, finding a two-layer structure consisting of a silica portion and a multi-phase metallized portion.

The gold-plated silica was analyzed by Auger electron spectroscopy, by which constituent elements were analyzed in a depth direction while ion etching the surface. The silica particles were found to have a four-layer structure consisting of a gold layer, a nickel layer, a silicon compound layer (carbon and silicon-containing layer) and a silica layer stacked in the depth direction. The silica particles had a yellow outer appearance when observed under a microscope, and a specific gravity of 3.5. The gold layer was 0.03 µm thick, the nickel layer was 0.25 µm thick, and the silicon compound layer was 0.1 µm thick.

Properties of Conductive Silica having Silica-Silicon Compound-nickel-gold Structure The electric resistivity of the gold-plated silica was determined by introducing the gold-plated silica into a cylindrical cell having four terminals, conducting a current of 1 mA to 10 mA across the terminals of 0.2 $cm^2$ area at the opposed ends from a current source SMU-257 (Keithley Co.), and measuring a voltage drop across the 0.2 cm spaced apart terminals at the center of the cylinder by means of a nanovolt meter model 2000 (Keithley Co.). The resistivity was determined 2.2 mΩ-cm. The silica was milled in a mortar for one minute and heat treated at 200° C. for 4 hours whereupon it was examined for any change. No changes of outer appearance and resistivity were found. The metallized silica particles had a specific surface area of 0.4 $m^2/g$ and a specific gravity of 2.39.

Synthesis Example 2

The procedure of Synthesis Example 1 was repeated except that the silica used herein was spherical silica US-10 (Mitsubishi Rayon K.K., mean particle size 10 µm) from which a fraction of particles having a size of less than 4 µm was removed. There were obtained metallized silica particles with nickel-gold structure having a specific gravity of 3.0 and a resistivity of 3 mΩ-cm.

Synthesis Example 3

The procedure of Synthesis Example 1 was repeated except that the silica was replaced by aluminum oxide whose primary particles had a mean particle size of 20 nm (Oxide C by Nippon Aerosil K.K.). There were obtained metallized alumina particles with nickel-gold structure having a resistivity of 3 mΩ-cm.

Synthesis Example 4

The procedure of Synthesis Example 1 was repeated except that the silica was replaced by spherical particles of polymethyl methacrylate resin having a mean particle size of 1 μm. There were obtained metallized resin particles with nickel-gold structure having a resistivity of 4 mΩ-cm.

Examples 1–3 & Comparative Examples 1–3

Conductive silicone rubber compositions were prepared by adding the metallized silica having a specific surface area of 0.4 m²/g and a specific gravity of 2.39 obtained in Synthesis Example 1 to KE-520-U containing 85% by weight of organopolysiloxane (trade name, Shin-Etsu Chemical Co., Ltd.) in the proportion shown in Table 1. With Peroxide C-8A (trade name, Shin-Etsu Chemical Co., Ltd.) added, the compositions were compression molded at 170° C. for 10 minutes into sheets of 1 mm thick. The sheets were post cured at 150° C. for one hour and measured for resistivity according to the measurement method of SRIS-2301.

For examining environmental dependency, the sheets were held for 7 days in an environment of 50° C. and RH 90%. A resistivity was measured again (aged resistivity).

Comparative Example 1 used 450 parts of silver powder, Comparative Example 2 used a less amount of the metallized silica, and Comparative Example 3 used 300 parts of silver-plated glass beads S-5000S-3 (Toshiba Varotini K.K.).

TABLE 2

|  | Components (pbw) | Example 4 | Example 5 | Example 6 |
|---|---|---|---|---|
| Compound | KE-520-U | 100 | 100 | 100 |
|  | Metallized silica (Synthesis Example 2) | — | — | 250 |
|  | Metallized alumina (Synthesis Example 3) | 300 | — | — |
|  | Metallized resin (Synthesis Example 4) | — | 250 | — |
| Above-formulated compound |  | 100 | 100 | 100 |
| C-8A |  | 0.4 | 0.4 | 0.4 |
| Volume fraction of metallized particles (vol %) |  | 48 | 52 | 47 |
| Initial resistivity (Ω-cm) |  | $3 \times 10^{-2}$ | $1 \times 10^{-2}$ | $5 \times 10^{-2}$ |
| Aged resistivity (Ω-cm) |  | $4 \times 10^{-2}$ | $2 \times 10^{-2}$ | $6 \times 10^{-2}$ |

TABLE 1

|  |  | Example | | | Comparative Example | | |
|---|---|---|---|---|---|---|---|
| Components (pbw) |  | 1 | 2 | 3 | 1 | 2 | 3 |
| Compound | KE-520-U | 100 | 100 | 100 | 100 | 100 | 100 |
|  | Metallized silica | 300 | 350 | 300 | — | 70 | — |
|  | Acetylene black | — | — | 5 | — | — | — |
|  | Silver powder | — | — | — | 450 | — | — |
|  | Silver-plated glass beads | — | — | — | — | — | 300 |
| Above-formulated compound |  | 100 | 100 | 100 | 100 | 100 | 100 |
| C-8A |  | 0.4 | 0.4 | 0.4 | 0.4 | 0.4 | 0.4 |
| Volume fraction of metallized silica (vol %) |  | 56 | 61 | 56 | — | 23 | — |
| Initial resistivity (Ω-cm) |  | $2 \times 10^{-2}$ | $7 \times 10^{-3}$ | $1 \times 10^{-3}$ | $5 \times 10^{-4}$ | insulating | $1 \times 10^{-4}$ |
| Aged resistivity (Ω-cm) |  | $4 \times 10^{-2}$ | $1 \times 10^{-2}$ | $3 \times 10^{-2}$ | $8 \times 10^{-2}$ | insulating | $5 \times 10^{-2}$ |

Examples 4–6

Conductive silicone rubber compositions were prepared as in Example 1 using the metallized silica, metallized alumina and metallized resin obtained in Synthesis Examples 2 to 4, respectively. The properties of cured parts of these compositions were examined, with the results shown in Table 2.

There has been described a conductive silicone rubber composition in which conductive particles obtained by metallizing base particles are blended in silicone rubber. The conductive particles were effectively dispersible. The composition cures into silicone rubber having a low and stable volume resistivity.

Japanese Patent Application Nos. 11-285141 and 12-078862 are incorporated herein by reference.

Reasonable modifications and variations are possible from the foregoing disclosure without departing from either the spirit or scope of the present invention as defined by the claims.

What is claimed is:

1. A conductive silicone rubber composition comprising:

(A) 100 parts by weight of an organopolysiloxane having at least two aliphatic unsaturated groups, represented by the following average compositional formula $$R^1{}_n SiO_{(4-n)/2} \tag{1}$$

wherein $R^1$, which may be the same or different, is a substituted or unsubstituted monovalent hydrocarbon group and n is a positive number of 1.98 to 2.02, (B) 90 to 800 parts by weight of conductive particles which are base particles of an inorganic material or organic resin coated on their surface through a layer of a silicon compound with a plated metal layer, and (C) a sufficient amount to cure component (A) of a curing agent.

2. The conductive silicone rubber composition of claim 1 wherein the conductive particles (B) are comprised of base particles coated through the layer of the silicon compound with a nickel layer and further with a gold layer.

3. The conductive silicone rubber composition of claim 1 wherein the base particles in (B) are formed of silica.

4. The conductive silicone rubber composition of claim 1 wherein the conductive particles (B) have a specific surface area of up to 1 m$^2$/g.

5. The conductive silicone rubber composition of claim 1 wherein the conductive particles (B) account for 25 to 75% by volume of the entire composition.

6. The conductive silicone rubber composition of claim 1 wherein said silicon compound has a reducing ability.

7. The conductive silicone rubber composition of claim 6 wherein said silicon compound is a polysilane having Si—Si bonds in the backbone, represented by the following general formula (2):

$$(R^2_m R^3_k X_p Si)_q \qquad (2)$$

wherein $R^2$ and $R^3$, which may be the same or different, are independently hydrogen or substituted or unsubstituted, monovalent hydrocarbon groups, X is a group as defined for $R^2$, an alkoxy group, halogen atom, oxygen atom or nitrogen atom, letter m is a number from 0.1 to 1, k is from 0.1 to 1 and p is from 0 to 0.5 while they satisfy $1 \leq m+k+p \leq 2.5$, and q is an integer in the range of from 2 to 100,000.

8. The conductive silicone rubber composition of claim 6 wherein said silicon compound is a polysiloxane having Si—H groups on side chains and Si—O—Si bonds on the backbone, represented by the following general formula (3):

$$(R^4_a R^5_b H_c SiO_d)_e \qquad (3)$$

wherein $R^4$ and $R^5$, which may be the same or different, are independently hydrogen, substituted or unsubstituted, monovalent hydrocarbon groups, alkoxy groups or halogen atoms, letter "a" is a number from 0.1 to 1, b is from 0.1 to 1, and c is from 0.01 to 1 while they satisfy $1 \leq a+b+c \leq 2.5$, and letter e is an integer from 2 to 100,000.

* * * * *